United States Patent
Wakaura

(10) Patent No.: US 8,830,543 B2
(45) Date of Patent: Sep. 9, 2014

(54) IMAGE READING APPARATUS FOR DISPLAYING STATES OF MEDIUM CONVEYED AND IMAGE READING SYSTEM HAVING THE IMAGE READING APPARATUS

(75) Inventor: Tomomi Wakaura, Ishikawa (JP)

(73) Assignee: PFU Limited, Ishikawa (JP)

( * ) Notice: Subject to any disclaimer, the term of this patent is extended or adjusted under 35 U.S.C. 154(b) by 431 days.

(21) Appl. No.: 13/046,193

(22) Filed: Mar. 11, 2011

(65) Prior Publication Data

US 2011/0292474 A1 Dec. 1, 2011

(30) Foreign Application Priority Data

Jun. 1, 2010 (JP) ................................ 2010-126117

(51) Int. Cl.
*H04N 1/04* (2006.01)
*H04N 1/00* (2006.01)

(52) U.S. Cl.
CPC ...... *H04N 1/0057* (2013.01); *H04N 2201/0081* (2013.01); *H04N 1/00588* (2013.01); *H04N 1/0049* (2013.01); *H04N 1/00408* (2013.01); *H04N 1/00689* (2013.01); *H04N 1/00236* (2013.01); *H04N 1/00663* (2013.01); *H04N 1/00771* (2013.01); *H04N 1/00241* (2013.01)
USPC ........................... 358/498; 358/474; 358/496

(58) Field of Classification Search
USPC .......... 358/400, 401, 471, 474, 496, 498, 296
See application file for complete search history.

(56) References Cited

U.S. PATENT DOCUMENTS 5,060,080 A * 10/1991 Hwang ........................ 358/401
5,138,674 A * 8/1992 Sugawa ........................ 382/172
5,794,099 A * 8/1998 Sheldon et al. ................. 399/82
5,875,033 A * 2/1999 Kawata et al. ................ 358/296
7,295,354 B2 11/2007 Takaoka
2004/0150861 A1* 8/2004 Van Der Heijden .......... 358/406

FOREIGN PATENT DOCUMENTS

| JP | 05-004761 | 1/1993 |
|---|---|---|
| JP | 2000-295420 A | 10/2000 |
| JP | 2004-289496 A | 10/2004 |
| JP | 3802336 | 5/2006 |
| JP | 2007-219956 A | 8/2007 |
| JP | 2008-167093 A | 7/2008 |

OTHER PUBLICATIONS

Office Action issued in Japanese Application No. 2010-126117, dated Jan. 21, 2014.

* cited by examiner

*Primary Examiner* — Thomas D Lee
(74) *Attorney, Agent, or Firm* — McDermott Will & Emery LLP

(57) ABSTRACT

An image reading apparatus includes an operating unit that issues a starting instruction to start reading a medium which is a read-target medium, according to a user's operation, a conveying unit that conveys the medium, a display unit that displays states of the medium conveyed, a reading unit that reads the medium, and a medium detecting unit that detects the medium. The display unit displays contents indicating that the reading operation is possible when the reading operation of the medium is completed and the medium detecting unit does not detect the medium. The conveying unit starts conveyance of the medium in response to the read-operation starting instruction, when the read-target medium is a first medium in a set of media, and when the medium detecting unit detects the first medium, and the conveying unit starts conveyance of the medium, when the read-target medium is a second or later medium in the set of media, after the medium detecting unit detects the second or later medium.

7 Claims, 6 Drawing Sheets

IMAGE READING APPARATUS FOR DISPLAYING STATES OF MEDIUM CONVEYED AND IMAGE READING SYSTEM HAVING THE IMAGE READING APPARATUS

CROSS-REFERENCE TO RELATED APPLICATIONS

This application is based upon and claims the benefit of priority from Japanese Patent Application No. 2010-126117, filed Jun. 1, 2010, the entire contents of which are incorporated herein by reference.

BACKGROUND OF THE INVENTION

1. Field of the Invention

The present invention relates to an image reading apparatus and an image reading system.

2. Description of the Related Art

Conventionally, technologies on image reading apparatuses capable of successively reading a plurality of media have been known. Japanese Patent No. 3802336 discloses a technology on an image reading apparatus that includes a reading unit for reading originals; a time measuring unit for selectively measuring a plurality of different times; and a separating unit for determining separation of the originals read by the reading unit. In this image reading apparatus, when a selected time has elapsed without operations related to a next image read operation after a read operation by the reading unit is interrupted, it is determined that the originals are separated at this point.

There is a growing demand for improvement in the operability of the image reading apparatus that successively read a plurality of media. For example, if it is possible to reduce time lag that occurs when a medium is fed subsequent to a medium being read, it is possible to reduce a read time, enabling to improve the operability.

It is an object of the present invention to provide an image reading apparatus and an image reading system that are capable of improving the operability for successively reading a plurality of media.

SUMMARY OF THE INVENTION

It is an object of the present invention to at least partially solve the problems in the conventional technology.

According to an aspect of the present invention, an image reading apparatus includes an operating unit that is configured to issue a read-operation starting instruction for starting a reading operation on a read-target medium, according to a user's operation; a conveying unit that conveys the read-target medium; a display unit that displays states of the read-target medium conveyed; a reading unit that is configured to read the read-target medium; and a medium detecting unit that detects the read-target medium.

The display unit is configured to display contents indicating that the reading operation is possible when the reading operation of the read-target medium is completed and the medium detecting unit does not detect the read-target medium, and the conveying unit is configured to start conveyance of the read-target medium in response to the read-operation starting instruction issued by the operating unit, when the read-target medium is a first medium in a set of media, and when the medium detecting unit detects the first medium, and start conveyance of the read-target medium, when the read-target medium is a second or later medium in the set of media, after the medium detecting unit detects the second or later medium.

According to another aspect of the present invention, an image reading system includes an image reading apparatus which includes an operating unit that is configured to issue a read-operation starting instruction for starting a reading operation on a read-target medium, according to a user's operation, a conveying unit that conveys the read-target medium, a display unit that displays states of the read-target medium conveyed, a reading unit that is configured to read the read-target medium, and a medium detecting unit that detects the read-target medium.

The display unit is configured to display contents indicating that the reading operation is possible when the reading operation of the read-target medium is completed and the medium detecting unit does not detect the read-target medium, the conveying unit is configured to start conveyance of the read-target medium in response to the read-operation starting instruction issued by the operating unit, when the read-target medium is a first medium in a set of media, and when the medium detecting unit detects the first medium, and the conveying unit is further configured to start conveyance of the read-target medium, when the read-target medium is a second or later medium in the set of media, after the medium detecting unit detects the second or later medium; and a computer connected to the image reading apparatus. The computer is configured to display a selection screen for selecting an application software to be started in connection with an instruction, which is an instruction to end reading operation of the read-target medium and is issued by the operating unit according to an operation performed by the user, and to start executing the application upon selection of the application on the selection screen, so that the image data of the original can be processed by the selected application.

According to further aspect of the present invention, an image reading system includes the image reading apparatus and a computer connected to the image reading apparatus.

The computer is configured to start a predetermined application in connection with an instruction, which is an instruction to end reading of the read-target medium and is issued by the operating unit operated by the user, so that the image data of the original can be processed by the selected application.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image reading apparatus and an image reading system according to the present invention will be explained in detail below with reference to the accompanying drawings. The present invention is not limited to the embodiments.

The components in the following embodiment may include those which a person skilled in the art would easily conceive from the embodiments disclosed and those which are substantially equivalent to the components disclosed in the embodiment. In the following description of the embodiment, an image scanner is used as an image reading device, but the invention is not limited thereto.

Figure 1:
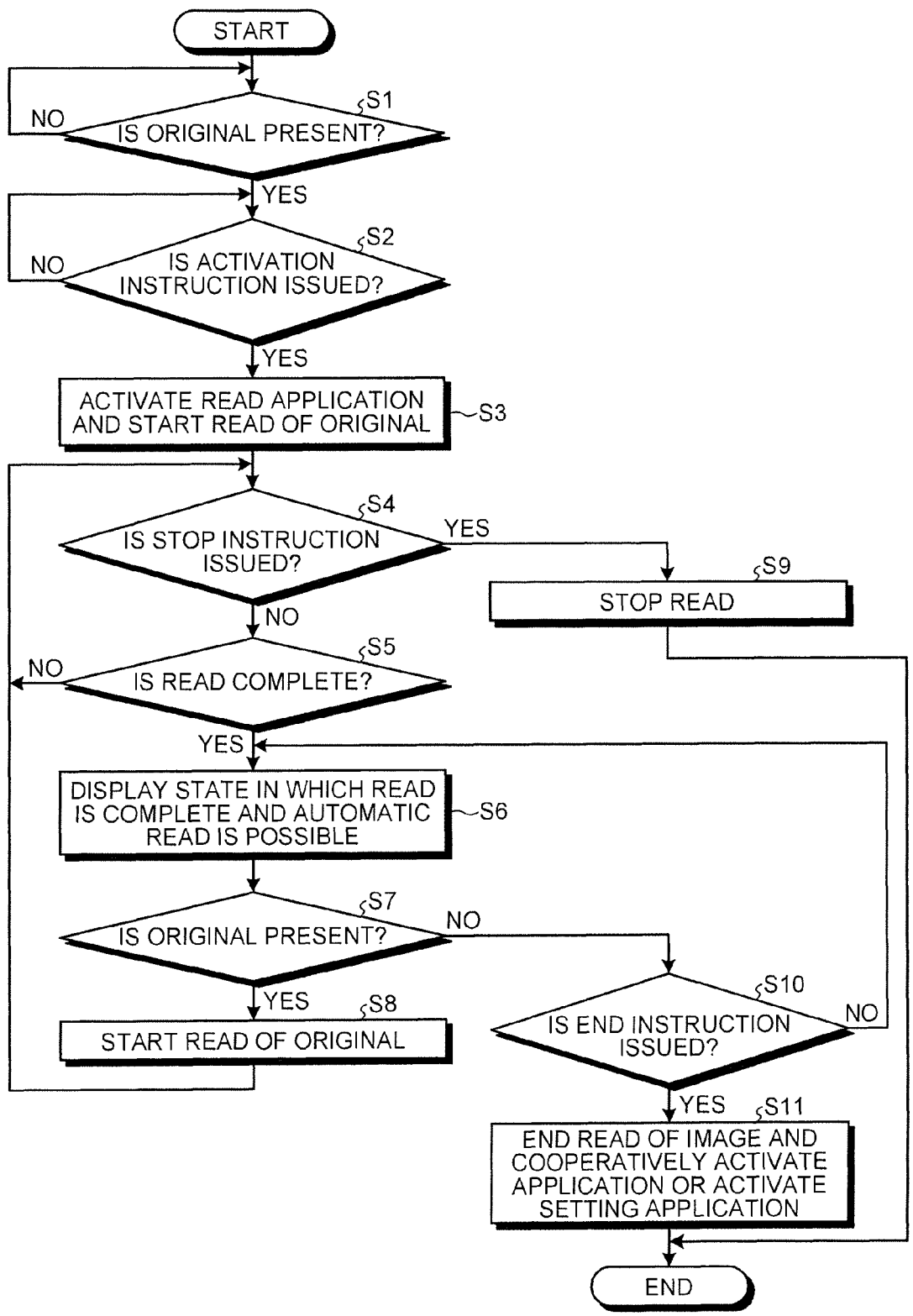
FIG. 1 is a flowchart of an operation performed by an image reading apparatus according to an embodiment.
Figure 2:
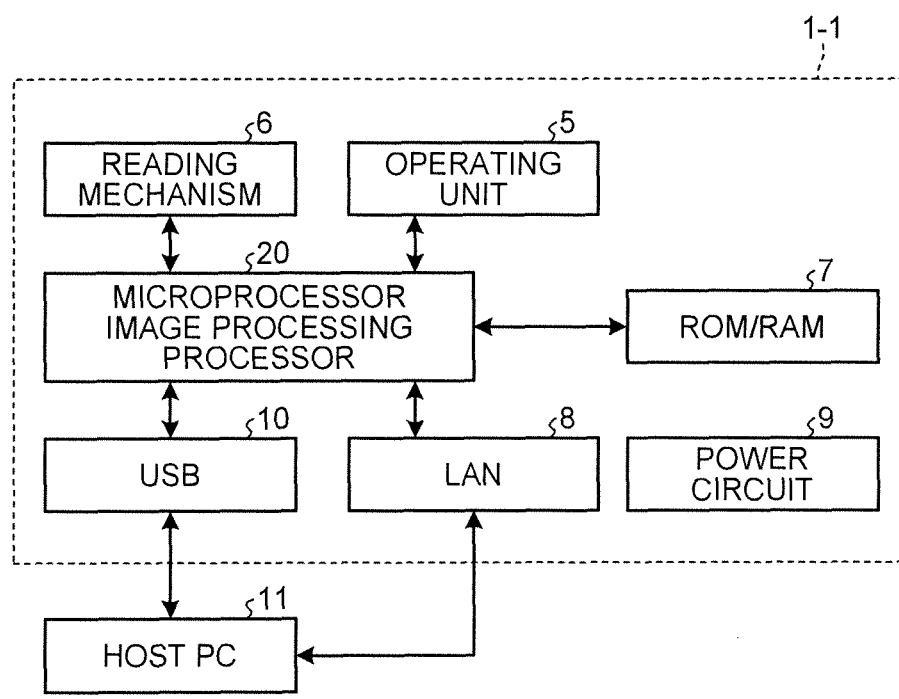
FIG. 2 is a block diagram of the image reading apparatus and an image reading system according to the embodiment.
Figure 3:
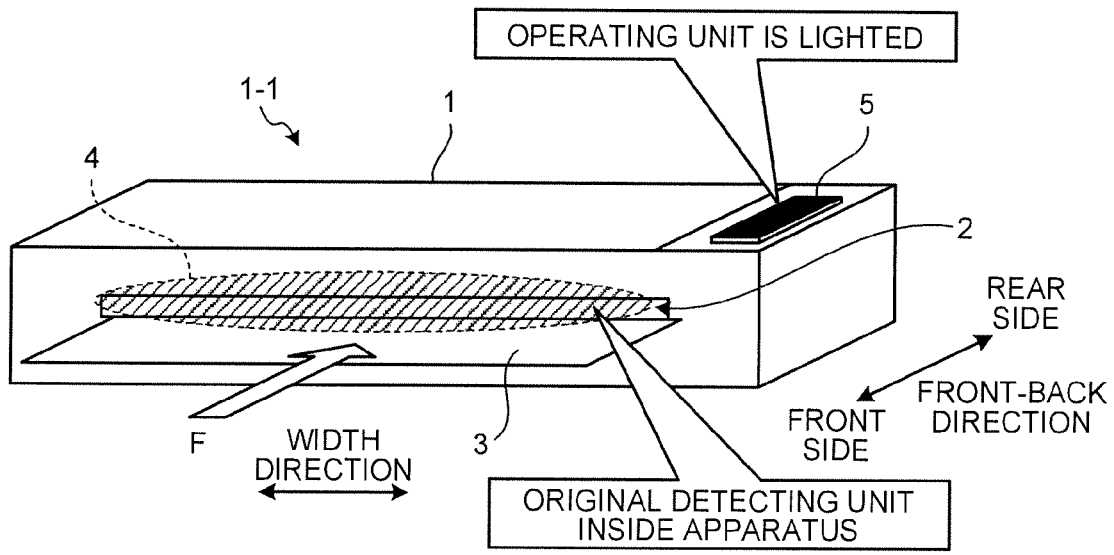
FIG. 3 is a perspective view of the image reading apparatus according to the embodiment.

An embodiment of the present invention will be described below with reference to FIG. 1 to FIG. 11. The present embodiment relates to an image reading apparatus and an image reading system. FIG. 1 is a flowchart of an operation performed by the image reading apparatus according to the embodiment. FIG. 2 is a block diagram of the image reading apparatus and an image reading system according to the present embodiment. FIG. 3 is a perspective view of the image reading apparatus according to the embodiment.

An image reading apparatus 1-1 according to the embodiment shown in FIG. 3 captures an image of a sheet-medium, i.e., a read-target medium, which is inserted as an original to be read, and generates image data. The image reading apparatus 1-1 is applied to, for example, an image scanner, a copier, a facsimile machine, or a character recognition apparatus. In the following descriptions, the read-target medium may be simply described as a "medium" or an "original".

A feed port 2 is formed on the front face of a cover 1 of the image reading apparatus 1-1. A hopper 3, on which a medium S to be fed is placed, is arranged at the feed port 2. The hopper 3 protrudes forward from the feed port 2 of the image reading apparatus 1-1. The top surface of the hopper 3 functions as a guide for the medium S to be inserted into the feed port 2. The medium S inserted into the feed port 2 is conveyed through a conveyance path inside the image reading apparatus 1-1 in a conveyance direction F by feed rollers which are not shown in the drawings. A read medium S, i.e., a medium S which has been read by the image reading apparatus 1-1 is discharged from, for example, the back side, i.e., the rear side, of the image reading apparatus 1-1.

In the following descriptions, a front-back direction and a width direction respectively indicate a front-back direction, i.e., a depth direction, and a width direction of the image reading apparatus 1-1 in the installed state. Further, the width direction of the image reading apparatus 1-1 coincides with a width direction of a medium S being conveyed.

An original detecting unit 4 that detects the medium S inserted into the feed port 2 is disposed inside the image reading apparatus 1-1. The original detecting unit 4 corresponds to a medium detecting unit that detects the read-target medium. The original detecting unit 4 may be, for example, a known mechanical sensor or a known non-contact sensor such as a photo sensor or an ultrasonic sensor. Upon detection of the medium S, the original detecting unit 4 outputs a signal indicating detection of the medium S.

An operating unit 5 is provided on the top surface of the cover 1 and instructs the image reading apparatus 1-1 to, for example, start a read operation on the medium S in accordance with a user's operation. The operating unit 5 is disposed on the top surface of the cover 1 at one end thereof in the width direction. The operating unit 5 of the embodiment includes a switch such as a button switch (hereinafter, button) or a touch-panel switch (hereinafter, touch panel), which enables the user to issue an instruction for the image reading apparatus 1-1 to perform operations by pressing or by touching the operating unit 5. The operating unit 5 also functions as a display unit for displaying a state of the read-target medium conveyed or the medium S conveyed. The operating unit 5 includes light sources for a plurality of colors, such as LEDs (Light Emitting Diodes), and a cover that covers the light sources. The cover is made of a material with a light transmission property, so that ON and OFF of the light sources of the operating unit 5 and the colors of the light sources can be viewed from the outside. When the operating unit 5 is a touch panel, display contents may be changed depending on the instruction.

As shown in FIG. 2, the image reading apparatus 1-1 includes, in addition to the operating unit 5, a reading mechanism 6, a storage device 7, a LAN (Local Area Network) port 8, a power circuit 9, a USB (Universal Serial Bus) port 10, and a control unit 20. The reading mechanism 6 includes conveying rollers as a conveying unit for conveying an original, i.e., the read-target medium, and a reading unit for reading the original, i.e., the read-target medium. The reading unit is not shown in the drawings. The conveying rollers are formed of a pair of rollers including a driving roller and a driven roller. The driving roller and the driven roller rotate to convey the original while sandwiching the original between the driving roller and the driven roller. The reading unit captures an image of the original being conveyed and generates image data. The reading unit includes, for example, a plurality of CMOS (Complementary Metal Oxide Semiconductor) imaging elements. In the reading unit, the imaging elements are arranged on a line in a main-scanning direction perpendicular to the conveyance direction F. The reading unit generates and outputs line data for each line in the main-scanning direction based on a captured-image signal, which is output from each imaging element per exposure.

The control unit 20 includes a processor such as a microprocessor, or an image processing processor, and performs overall control on the image reading apparatus 1-1. The control unit 20 is connected to the operating unit 5, the reading mechanism 6, the storage device 7, the LAN port 8, and the USB port 10, and able to exchange signals with these devices. The control unit 20 is also connected to the original detecting unit 4. A signal indicating a detection result of the original detecting unit 4 is input to the control unit 20. The user can instruct one of various operations according to the state of the medium S conveyed, and when the user operates the operating unit 5, a signal indicating the operation corresponding to the state of the medium S is input to the control unit 20. The control unit 20 operates the conveying rollers and the reading unit of the reading mechanism 6. The reading mechanism 6 sends image data of the image captured by the reading unit to the control unit 20. A ROM (Read Only Memory) of the storage device 7 stores one or more programs in advance including a control program for the image reading apparatus 1-1. The control unit 20 controls the image reading apparatus 1-1 according to the control program. The control unit 20 can store data such as image data in a RAM (Random Access Memory) of the storage device 7.

The LAN port 8 and the USB port 10 are interfaces that enable communications between external apparatuses and the control unit 20. According to the embodiment, the control unit 20 is connected to a host PC (Personal Computer) 11, via at least one of the LAN port 8 and the USB port 10. The host PC 11 is able to exchange information with the control unit 20 via the LAN port 8 or the USB port 10. The control unit 20 outputs read image data to the host PC 11. The host PC 11 is able to perform operations or settings on the image reading apparatus 1-1. More specifically, the host PC 11 is able to output operation instructions to the control unit 20 such as starting or stopping of reading operation of the medium S, and ending of reading operation. The image reading system according to the embodiment includes the image reading apparatus 1-1 and the host PC 11.

A graphical user interface (GUI) of a reading application software, hereinafter reading application, relating to operations and settings of the image reading apparatus 1-1 is displayed on a screen of the host PC 11. Buttons for the operations and settings are arranged on the screen displaying GUI of the reading application. When a button is pressed, i.e., clicked by a pointing device such as a mouse, an instruction on an operation or a setting corresponding to the button clicked is output to the image reading apparatus 1-1. With the host PC 11, the operations and settings on the image reading apparatus 1-1 can also be performed by operating a keyboard.

In the embodiment, instruction contents that the user can give to the image reading apparatus 1-1 by pressing the operating unit 5 depends on the state of the medium S conveyed. In a ready-for-conveyance state, start of reading operation is instructed by pressing the operating unit 5. The ready-for-conveyance state is a state in which the original detecting unit 4 has detected an original and the conveying rollers are ready to start conveyance of the original. When the original detecting unit 4 detects an original which is a first original the user has inserted, the image reading apparatus 1-1 of the embodiment rotates the conveying rollers to perform preparatory insertion for drawing a leading end of the original into the conveying rollers. The preparatory insertion is performed before an instruction to start the reading operation or start-reading instruction (hereinafter, starting instruction) is given to the operating unit 5. The original is held between the driving roller and the driven roller of the conveying rollers as a result of the preparatory insertion, the image reading apparatus 1-1 is brought into a condition where the original can be immediately conveyed in response to the read start instruction given by the user.

In the embodiment, the state in which the preparatory insertion is performed is referred to as the ready-for-conveyance state; however, the ready-for-conveyance state is not limited to this. For example, the ready-for-conveyance state may include a state from when the original detecting unit 4 detects the original to when the preparatory insertion is completed. Or, without performing the preparatory insertion, the ready-for-conveyance state may be a state in which the original detecting unit 4 detects the original and the conveying rollers are ready to draw the original at any time.

When the image reading apparatus 1-1 is conveying the original, i.e., the image reading apparatus 1-1 is in an original conveyance state, the user can instruct the image reading apparatus 1-1 to stop the reading operation by pressing the operating unit 5. Namely, in the original conveyance state, instruction contents given to the image reading apparatus 1-1 by the operation of the operating unit 5 is to stop the reading operation of the original, or stop-reading instruction (hereinafter, stopping instruction), instead of the starting instruction. The original conveyance state is a state in which the original is being conveyed by the conveying rollers and the reading operation of the original is being performed. When the image reading apparatus 1-1 has completed conveying the original, i.e., the image reading apparatus 1-1 is in an original conveyance completion state, and when the original detecting unit 4 does not detect the original, the user can instruct the image reading apparatus 1-1 to end the reading operation by pressing the operating unit 5. Namely, after the conveyance of the original is completed and before a next original is inserted, instruction contents given to the image reading apparatus 1-1 by the operation of the operating unit 5 is to end the reading operation of the original, or end-reading instruction (hereinafter, ending instruction), instead of the starting instruction. The conveyance end state is a state in which the conveying roller ends conveyance of the original. The original conveyance completion state may be a state in which the original is discharged from a conveying path.

It is possible to separate the original conveyance state and the original conveyance completion state based on a timing when the image reading apparatus 1-1 has completed reading the original, i.e., a timing when the original has passed the reading unit. For example, the original conveyance state may be a state from when the conveying rollers start conveyance of the original to when the original passes through the reading unit, and the original conveyance completion state may be a state after the original has passed through the reading unit. In this case, after the original has passed through the reading unit, the user can instruct the image reading apparatus 1-1 to end the reading operation even while the original is being conveyed by the conveying rollers. When the instruction to end the reading operation, or ending instruction, is issued before the original is discharged, the control unit 20 automatically performs a read completion operation after the original is discharged. Whether the reading operation of the original is completed, i.e., whether the original has passed through the reading unit, can be determined by, for example, detecting an edge of a trailing end of the original from the image data captured by the reading unit.

When the image reading apparatus 1-1 completes reading operation of the original or the read-target medium, and when the original detecting unit 4 does not detect the original, the image reading apparatus 1-1 displays, on the operating unit 5, a content indicating that the image reading apparatus 1-1 is ready to read a next original and notify the user that insertion of the next original is possible. When the original detecting unit 4 detects a first original, or a first medium in a set of media, the conveying roller starts conveyance of the original in response to the starting instruction given to the operating unit 5. Namely, the conveying rollers wait in the ready-for-conveyance state until the instruction is given by the user. For a second original or later (hereinafter the next original), i.e., a second or later medium in the set of media, the conveying rollers start conveyance of the next original after the original detecting unit 4 has detected the next original. For example, conveyance of the next original is started simultaneously with a timing when the next original is detected or in a predetermined time after detection of the next original. Namely, when the next original is inserted, reading operation of the next original is automatically started. The display on the operating unit 5 enables the user to confirm the timing when insertion of the next original is possible. Therefore, time lag between the originals or the read-target media can be reduced, enabling to improve the operability.

The operation performed by the image reading apparatus 1-1 will be described below with reference to FIG. 1. A control flow shown in FIG. 1 is executed by the image reading apparatus 1-1 in an idling state.

At Step S1, the control unit 20 determines whether an original is present. When the original, i.e., the medium S, inserted into the feed port 2 is detected based on a detection result of the original detecting unit 4, the control unit 20 makes an affirmative determination at Step S1. Before reading operation of the first original is started, the operating unit 5 lights up in a color indicating that an instruction to start reading operation is possible. According to the determination at Step S1, when it is determined that the original is present (Yes at Step S1), control proceeds to Step S2. When it is determined that the original is not present (No at Step S1), the determination at Step S1 is repeated.

At Step S2, the control unit 20 determines whether the starting instruction is issued. The state where the Step S1 is yes, is the ready-for-conveyance state in which the first original has been set. In this state, the operating unit 5 functions as a start button for issuing the starting instruction to start the reading operation of the original. The control unit 20 makes determination at Step S2 based on whether the operating unit 5 is pressed. According to the determination, when it is determined that the operating unit 5 is pressed, i.e., when the starting instruction is issued (Yes at Step S2), control proceeds to Step S3. When the starting instruction is not issued (No at Step S2), the determination at Step S2 is repeated.

At Step S3, the control unit 20 starts executing the reading application, and thereby starts reading the original. The control unit 20 notifies the host PC 11 that the user has issued the starting instruction, and requests to start execution of the reading application. The reading application is executed by the host PC 11. The reading application makes the host PC 11 display the image data sent by the image reading apparatus 1-1 on the screen of the host PC 11, and enables the host PC 11 to give instructions including the ending instruction to the image reading apparatus 1-1 through operations by the user. When the reading application is executed by the host PC 11, the control unit 20 causes the reading mechanism 6 to start reading the original. The control unit 20 causes the reading unit to start capturing the image, and causes the conveying rollers to start conveyance of the original. After execution of the process at Step S3, control proceeds to Step S4.

Figure 4:
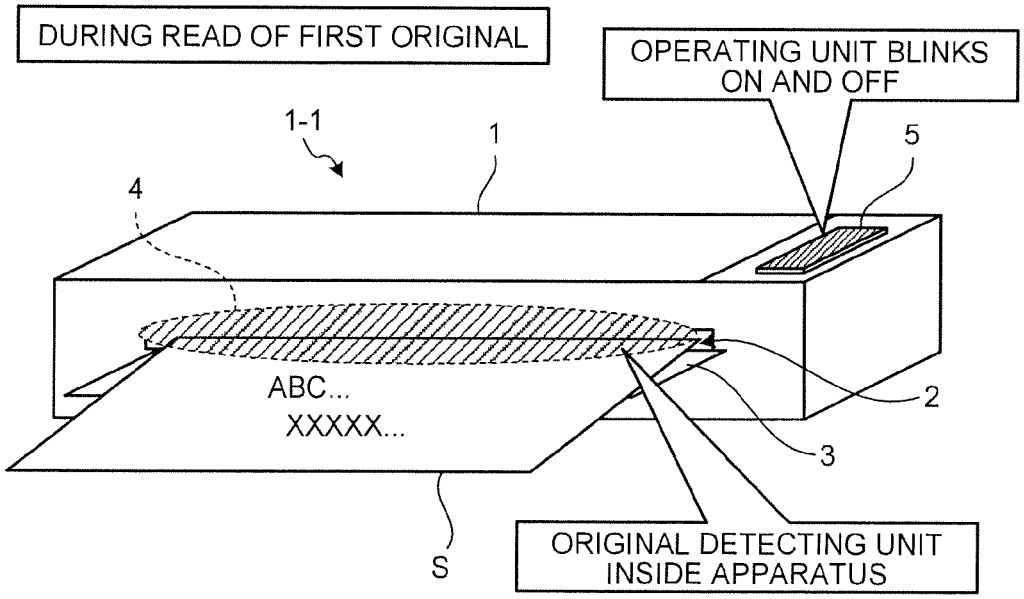
FIG. 4 is a perspective view of the image reading apparatus showing a conveyance state.

At Step S4, the control unit 20 determines whether the instruction to stop the reading operation, i.e., stop-reading instruction (hereinafter, stopping instruction) is issued. The control unit 20 continuously monitors whether the stopping instruction is issued by the user while the original is being read, i.e., in the conveyance state. In the conveyance state, the operating unit 5 functions as a stop button for issuing the stopping instruction. FIG. 4 is a diagram illustrating the conveyance state. In the conveyance state, the operating unit 5 blinks to indicate that the original is being conveyed and also indicate that the stopping instruction can be issued by pressing the operating unit 5. In the conveyance state, the stopping instruction can be also issued by the host PC 11. Although not shown in the drawings, a stop button is displayed on the display screen by the reading application in the conveyance state, and it is possible to instruct the image reading apparatus 1-1 to stop the reading operation of the original by the operation of pressing or clicking the stop button or by the keyboard operation. When the user issues the stopping instruction by using the operating unit 5 or by clicking the display screen displayed by the reading application, the control unit 20 makes affirmative determination at Step S4 (Yes at Step S4). According to the determination, when it is determined that the stopping instruction is issued (Yes at Step S4), control proceeds to Step S9. When it is determined that the stopping instruction is not issued (No at Step S4), control proceeds to Step S5.

At Step S5, the control unit 20 determines whether the reading operation is completed. The control unit 20 performs determination at Step S5 based on, for example, image data sent by the reading unit of the reading mechanism 6. The control unit 20 may determine whether the reading operation of the original is completed based on an edge of the trailing end side of the original S detected in the image data. It may be possible to arrange a sensor for detecting the original on the conveying path on a downstream side of the reading unit in the conveyance direction and determine that the reading operation is completed when the original has passed the sensor. After the reading operation is completed, the control unit 20 stops the conveying rollers. According to the determination at Step S5, when it is determined that the reading operation is completed (Yes at Step S5), control proceeds to Step S6. When it is determined that the reading operation is not completed (No at Step S5), control proceeds to Step S4.

Figure 5:
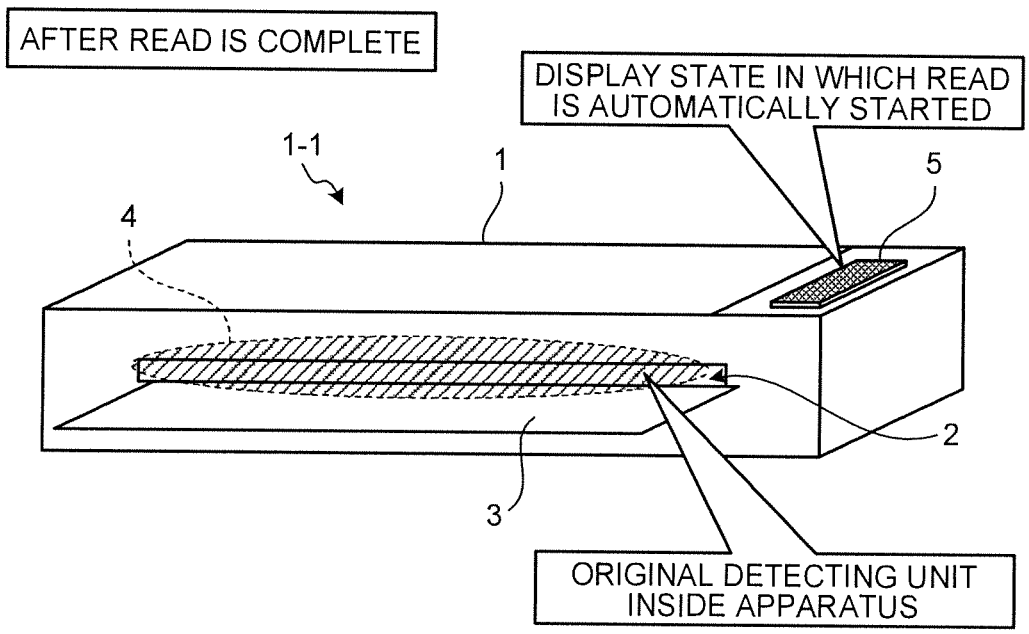
FIG. 5 is a perspective view of the image reading apparatus showing a continuous reading state.

At Step S6, the reading operation is completed by the control unit 20, and the control unit 20 displays a state in which and automatic reading is possible, i.e., an automatic reading state. The control unit 20 displays, on the operating unit 5 and on the display screen displayed by the reading application, that the image reading apparatus 1-1 automatically starts reading operation of the original upon insertion of the original into the feed port 2, i.e., continuous reading operation. In the following explanation, the state in which the reading operation of the original is automatically started upon setting of the original and detection of the original by the original detecting unit 4 is described as a "continuous reading state". The continuous reading state corresponds to the state in which the image reading apparatus 1-1 is possible to read the original. The control unit 20 causes the operating unit 5 to blink in a pattern indicating the continuous reading state. FIG. 5 is a diagram illustrating the continuous reading state. The blinking cycle of the operating unit 5 at this time is different from the blinking cycle used when the operating unit 5 functions as the stop button for the reading operation. In the present embodiment, the continuous reading state is indicated by causing the operating unit 5 to blink. However, indication of the continuous reading state is not limited to above embodiment. It is possible to indicate the continuous reading state by lighting up the operating unit 5 in a color different from colors that are used when the operating unit 5 functions as the start button and the stop button.

Figure 7:
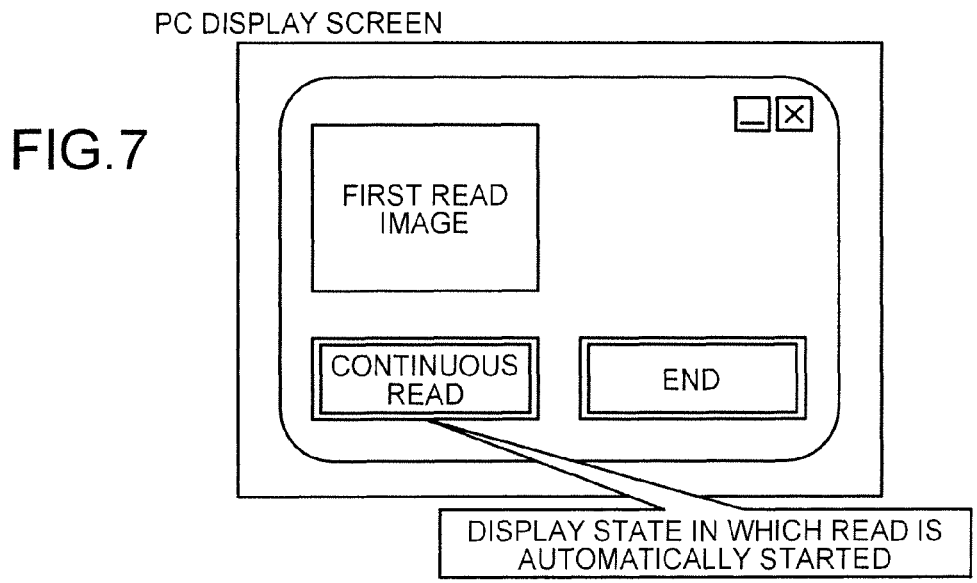
FIG. 7 shows a display screen showing a continuous reading state, when a reading application software is executed.
Figure 8:
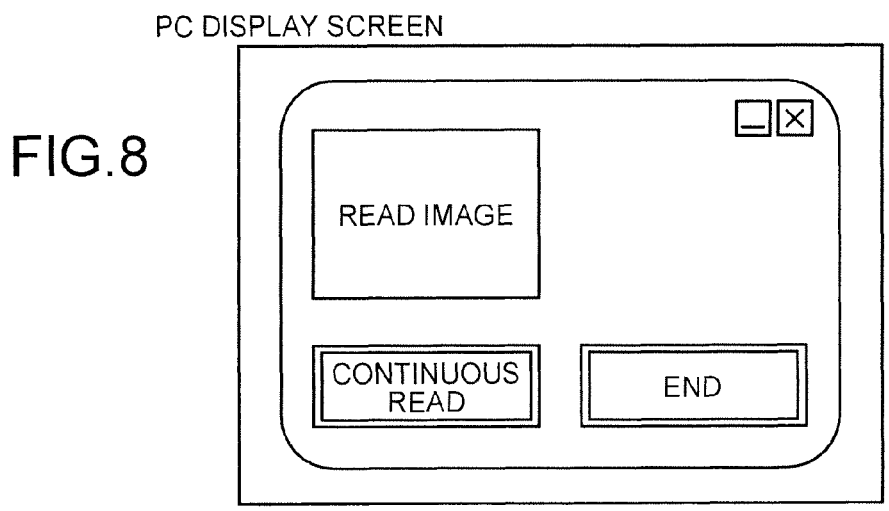
FIG. 8 shows a display screen showing a continuous reading state where reading of a second or later original is completed, when the reading application software is executed.

The control unit 20 notifies the host PC 11 of the continuous reading state. Accordingly, the host PC 11 displays the continuous reading state on the display screen displayed by the reading application. FIG. 7 shows the display screen displayed by the reading application where the continuous reading state is indicated. As shown in FIG. 7, image data of the first original and information indicating that the continuous reading operation is possible are displayed on the screen of the host PC 11. FIG. 8 shows the display screen displayed by the reading application when reading operation of the next original, i.e., the second or later original, is completed. When reading operation of the second or later original is completed, image data of the original read by the last operation is displayed instead of the image data of the first original shown in FIG. 7. The continuous reading state is displayed not only on the display screen displayed by the reading application but also on the operating unit 5, so that the user can know whether the next original can be inserted without checking the screen of the host PC 11.

At Step S7, the control unit 20 determines whether the original is present. The control unit 20 determines whether the original as a next reading target is set at the feed port based on the detection result of the original detecting unit 4. According to the determination, when it is determined that the original is present (Yes at Step S7), control proceeds to Step S8. When it is determined that the original is not present (No at Step S7), control proceeds to Step S10.

Figure 6:
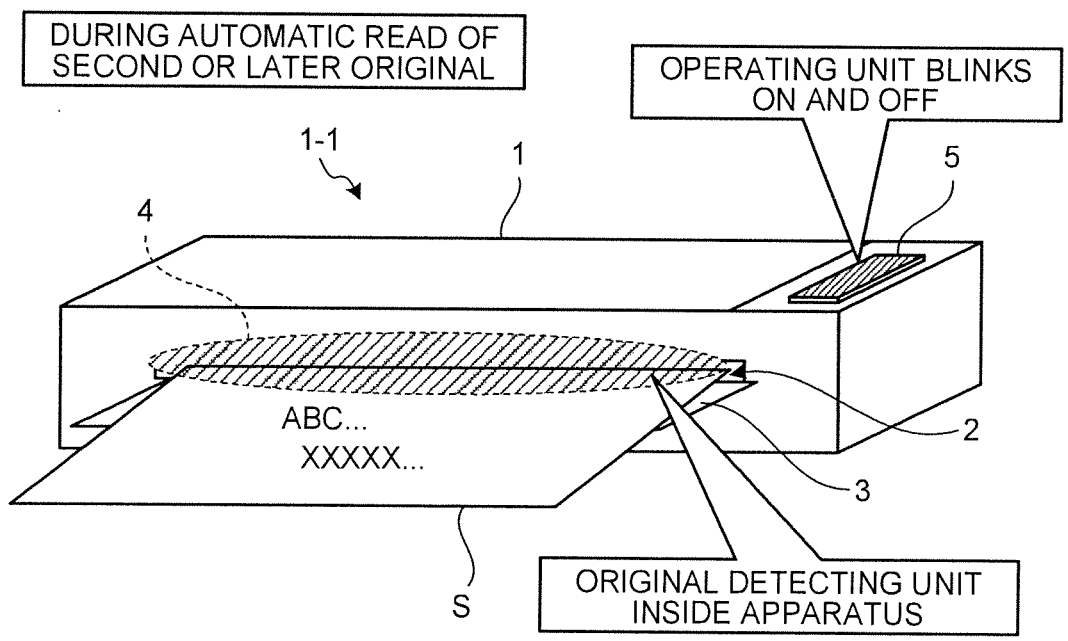
FIG. 6 is a perspective view of the image reading apparatus showing a state in which a second or later original is being conveyed.

At Step S8, the control unit 20 starts the reading operation of the original. FIG. 6 shows a state in which the next original, i.e., the second or later original, is being conveyed. While the second or later original is being read, the operating unit 5 blinks similarly to the blinking that occurs during the reading operation of the first original. After execution of the process at Step S8, control proceeds to Step S4 to perform control of reading operation.

Figure 9:
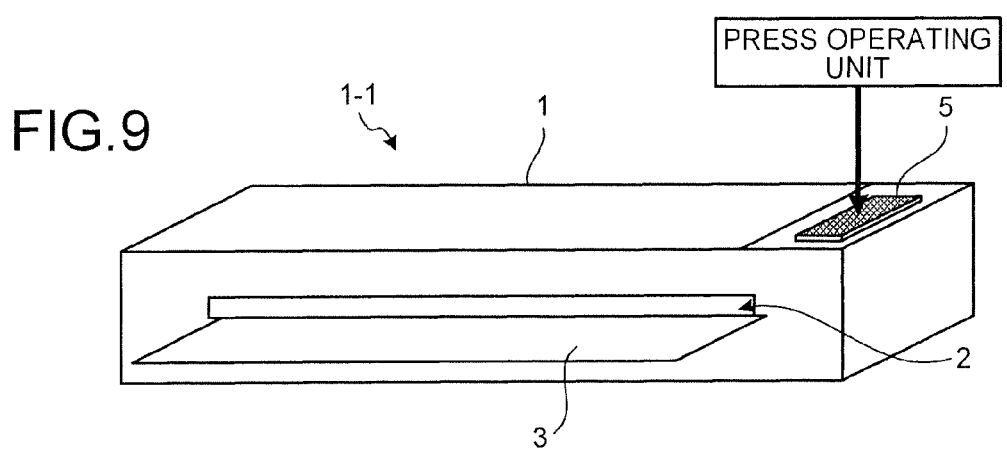
FIG. 9 is a perspective view of the image reading apparatus showing an operating unit to be pressed as an end button.

At Step S10, the control unit 20 determines whether the ending instruction is issued. In the original conveyance completion state in which the reading operation is completed and the next original is not inserted, the operating unit 5 functions as an end button for issuing the an instruction to end reading the original. FIG. 9 shows the operating unit 5 which functions as the end button when pressed. As shown in FIG. 7 and FIG. 8, in the conveyance end state, the end button is displayed on the display screen displayed by the reading application. When an operation of pressing the operating unit 5 or pressing or clicking of the end button on the display screen displayed by the reading application is performed, the control unit 20 makes affirmative determination at Step S10. When a predetermined time elapses in the conveyance end state without any operations by the user, it is possible to enter a power-saving mode for suppressing power consumption until a next operation is performed. As a result of the determination at Step S10, when it is determined that the end instruction is issued (Yes at Step S10), control proceeds to Step S11, and when it is determined that the end instruction is not issued (No at Step S10), control proceeds to Step S6.

Figure 10:
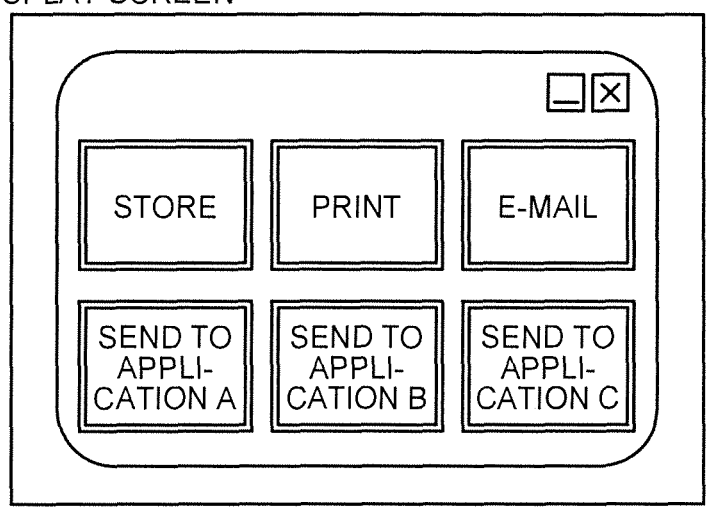
FIG. 10 shows a display screen showing an example of a linkage-start screen for application softwares.

At Step S11, the control unit 20 ends the reading operation of the image. Upon receiving a notice that the reading operation of the image has ended from the control unit 20, namely, the host PC 11 performs start of execution of linked application software in connection with the ending instruction by the user. Hereinafter, "start of execution of linked application software" is described as "linkage-start of execution of application" or just "linkage-start". Alternatively, the host PC 11 performs start of execution of preset application software. When the linkage-start of execution of application is performed in response to the notice sent by the control unit 20, a linkage-start screen is displayed on the display screen of the host PC 11. FIG. 10 shows an example of the linkage-start screen for linked applications. Start buttons of various applications that process image data of the read original are displayed on the linkage-start screen. That is, the host PC 11 displays a selection screen for selecting an application to be started in connection with the ending instruction issued by the user. When one of the start buttons is pressed, one of the applications is selected and the selected application is started for enabling the image data of the original, i.e., the read-target medium, to be processed by the selected application.

On the linkage-start screen, buttons such as a storage button (STORE), a print button (PRINT), an E-mail button (E-MAIL), start buttons for applications A, B, and C (APPLICATION A, APPLICATION B, APPLICATION C), are arranged. For example, when the storage button is pressed, or clicked, an application used for storing the image data, which is sent from the image reading apparatus 1-1 to the host PC 11, in a storage device of the host PC 11, is started, thereby enabling the image data of the original to be processed by the storage application. When the print button is pressed or clicked, an application for printing the image data, hereinafter printing application, is started, thereby enabling the image data of the original to be processed by the print application. When the E-mail button is pressed or clicked, an E-mail application is started, thereby enabling the image data to be processed by the E-mail application for generating an E-mail attached with the image data of the original. When one of the start buttons of the application A, B, or C is pressed, the selected application is started and the image data of the original can be processed by the selected application. For example, when an image editing application is started, the read image data can be edited.

Figure 11:
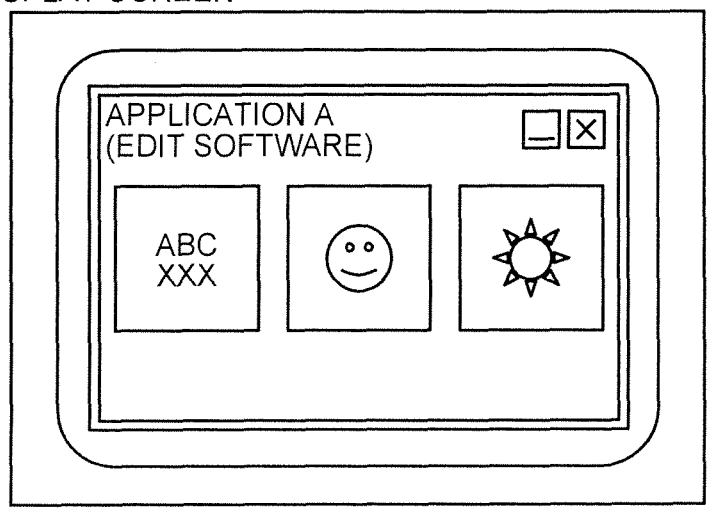
FIG. 11 shows a display screen showing an example of a preset application.

When a predetermined preset application is started in connection with the ending instruction, the preset application is started by the host PC 11, and the image data of the original can be used by the preset application. FIG. 11 shows a display screen of the PC 11 exemplary displaying one of the preset applications. For example, when an image edit application is designated as the preset application, each of the read image data, i.e., captured image data, is displayed on the edit screen. The preset application may be set in advance by the user. Accordingly, the user can start editing the read image only by instructing the image reading apparatus 1-1 to end the reading operation. Therefore, the operability can be improved. Whether the linkage-start screen for an application is displayed or the preset application is started may be determined based on whether the preset application is designated by the user. The host PC 11 may be configured such that it can perform only one of the display of the linkage-start screen for an application and start of the preset application. After execution of the process at Step S11, the control flow ends, and the image reading apparatus 1-1 enters the idling state.

When the answer for Step S4 is yes and control proceeds to Step S9, the control unit 20 stops the reading operation at Step S9. The control unit 20 stops imaging by the reading unit and discharges the original. It is possible to stop the conveying rollers together with the reading unit when the stop-reading instruction is issued. After execution of the process at Step S9, the control flow ends.

As described above, the image reading apparatus 1-1 according to the embodiment starts reading operation of the first original upon issuance of the starting instruction, and starts reading operation of the next original, i.e., the second or later original upon detection of the original by the original detecting unit 4. Therefore, when performing successive reading of a plurality of originals, or a set of originals, the user can concentrate on an operation for inserting the originals without performing operation of the buttons or operation of the host PC 11. Further, when the reading of the original is completed, the display content on the operating unit 5 is changed so as to indicate the continuous reading state. Therefore, the user can recognize a timing when to insert the next original without checking the screen of the host PC 11.

In a conventional image reading apparatus without an original separation mechanism, it is necessary to insert originals one by one. Therefore, for successively reading the originals, a subsequent page, or a subsequent original, is inserted with confirmation of the screen of the host PC 11. In this case, time lag occurs between confirmation of the screen and insertion of the subsequent page. When the subsequent original is inserted after confirming that the original has been discharged, and if the subsequent page is inserted before reading of the previous page is completed, the subsequent page is read as the same original as the previous page. If the subsequent page is inserted with a sufficient time interval, the subsequent page is not read as the same original. However, time lag occurs between the reading of the previous page and the subsequent page. In particular, in an image reading apparatus that conveys the original in a straight line such that the original is inserted from the front face and is discharged from the rear face, it is difficult for the user to confirm completion of discharge of the original. Therefore, it is often difficult to determine a timing for inserting the subsequent original.

The image reading apparatus 1-1 according to the embodiment can notify the user of an appropriate timing for inserting the subsequent original by using the operating unit 5. Therefore, the user can prepare the subsequent original while waiting for change in the display on the operating unit 5 during reading operation of the previous original, and, when the display on the operating unit 5 is changed to the continuous reading state, the user can immediately insert the subsequent original. Accordingly, time lag between reading operation of a plurality of originals can be reduced, enabling to improve the productivity and the user's operability of the image reading apparatus 1-1. Further, the user can correctly know whether the reading operation of the previous original is completed, so that it is possible to prevent the subsequent original from being read as the same original as the previous original.

In the image reading apparatus 1-1 according to the embodiment, the original, i.e., the medium S, is manually fed by the user. However, the image reading apparatus 1-1 is not limited thereto. The image reading apparatus 1-1 may include an ADF (Automatic Document Feeder) for automatically conveying one or more originals set in a tray. In the image reading apparatus having the ADF, by displaying the continuous reading state on the operating unit 5 when reading the last one of the originals set in the tray is completed, the user can know the timing of setting the subsequent one or more originals in the tray without checking the screen of the host PC 11. When the one or more original are additionally set in the tray during the continuous reading state, the host PC 11 can handle both of the image data of the originals that were previously set and have been read so far, and the image data of the newly-added originals as the same series of image data or as a set of image data. When the ending instruction is issued in the continuous reading state, it is possible to quit reading further originals, so that image data of originals that have been read so far can be processed as a series of image data.

The image reading apparatus 1-1 may be configured to read one side of the original or to read both sides of the original. When the image reading apparatus 1-1 is configured to read one side of an original and into which the original is manually fed by the user, the image reading apparatus 1-1 may be configured to be capable of notifying the user of reading a blank sheet, if the original of a blank sheet is read. For example, when the original that has been read is a blank sheet, the image reading apparatus 1-1 may display contents different from the continuous reading state on the operating unit 5. Thus configuring the image reading apparatus 1-1 would allow the user to check the original of the blank sheet before the subsequent original is inserted. Therefore, it is possible to reduce load or drudgery on the user and improve the operability. The image reading apparatus 1-1 may be configured to delete image data of the original when the original is a blank sheet.

Modification of the Embodiment

A modification of the embodiment will be described. In the above embodiment, the states of the original conveyed such as the continuous reading state is displayed on the operating unit 5. Alternatively or in addition to the above, the image reading apparatus 1-1 may be provided with another display unit, i.e., an additional display unit for displaying the states of the original conveyed. The additional display unit may be disposed on a portion other than the operating unit 5, for example, on the same surface as the surface on which the feed port 2 is formed on the cover 1. The display method on the additional display unit is not limited to lighting, blinking, or use of different colors of light. For example, the states of the original conveyed may be displayed using characters or texts. Further, the image reading apparatus 1-1 may audibly notify the user of the states of the original conveyed using sound or voice.

The image reading apparatus according to the present invention displays, on the display unit, a content indicating that reading operation is possible when the reading operation of a read-target medium is completed and the medium detecting unit does not detect the read-target medium. When the medium detecting unit detects a first read-target medium, the conveying unit starts conveyance of the read-target medium, or a first medium in a set of media, in response to the starting instruction given by the operating unit. For a second or later read-target medium, or a second or later medium in the set of media, the conveying unit starts conveyance of the read-target medium after the medium detecting unit detects the read-target medium. Therefore, according to the image reading apparatus of the present invention, it is possible to improve the operability for successively reading a plurality of media.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
an operating unit configured to issue a read-operation starting instruction for starting a reading operation on a read-target medium, according to a user's operation;
a conveying unit that conveys the read-target medium;
a display unit that displays states of the read-target medium conveyed;
a reading unit configured to read the read-target medium;
a control unit that controls the conveying unit and the reading unit; and
a medium detecting unit that detects the read-target medium, wherein
the display unit is configured to display contents indicating that the reading operation is possible when the reading operation of the read-target medium is completed after the read-target medium has passed through the reading unit being conveyed by the conveying unit and the medium detecting unit does not detect the read-target medium,
the conveying unit is configured to start conveyance of the read-target medium in response to the read-operation starting instruction issued by the operating unit, when the read-target medium is a first medium in a set of media, and when the medium detecting unit detects the first medium,
the conveying unit is further configured to start conveyance of the read-target medium, when the read-target medium is a second or later medium in the set of media, after the medium detecting unit detects the second or later medium, and
the control unit performs a read completion operation after the read-target medium is discharged, when an instruction to end the reading operation is issued by the user after the read-target medium passes through the reading unit and before the read-target medium is discharged.

2. The image reading apparatus according to claim 1, wherein
the conveying unit includes conveying rollers formed of a pair of rollers that are configured to rotate for conveying the read-target medium while sandwiching the read-target medium, and
when the medium detecting unit detects the first medium, the conveying unit performs preparatory insertion for drawing a leading end of the first medium into a nip between the pair of rollers by rotating the rollers before the read-operation starting instruction is issued by the operating unit.

3. The image reading apparatus according to claim 1, wherein
while the read-target medium is being conveyed, the operating unit issues an instruction to stop reading the read-target medium, instead of the read-operation starting instruction, according to an operation of the operating unit performed by the user.

4. The image reading apparatus according to claim 1, wherein
when conveyance of the read-target medium is completed and the medium detecting unit does not detect the read-target medium, the operating unit issues an instruction to end reading of the read-target medium, instead of the read-operation starting instruction, according to an operation of the operating unit performed by the user.

5. The image reading apparatus according to claim 1, wherein
the read-target medium is manually fed by the user,
the reading unit reads one side of the read-target medium, and
when the read-target medium for which reading operation is completed is a blank sheet, the display unit is configured to display contents different from the contents indicating that reading operation is possible.

6. An image reading system comprising:
an image reading apparatus including,
an operating unit that is configured to issue a read-operation starting instruction for starting a reading operation on a read-target medium, according to a user's operation,
a conveying unit that conveys the read-target medium,
a display unit that displays states of the read-target medium conveyed,
a reading unit that is configured to read the read-target medium,
a control unit that controls the conveying unit and the reading unit, and
a medium detecting unit that detects the read-target medium, wherein
the display unit is configured to display contents indicating that the reading operation is possible when the reading operation of the read-target medium is completed after the read-target medium has passed through the reading unit being conveyed by the conveying unit and the medium detecting unit does not detect the read-target medium,
the conveying unit is configured to start conveyance of the read-target medium in response to the read-operation starting instruction issued by the operating unit, when the read-target medium is a first medium in a set of media, and when the medium detecting unit detects the first medium, and the conveying unit is further configured to start conveyance of the read-target medium, when the read-target medium is a second or later medium in the set of media, after the medium detecting unit detects the second or later medium, and
the control unit performs a read completion operation after the read-target medium is discharged, when an instruction to end the reading operation is issued by the user after the read-target medium passes through the reading unit and before the read-target medium is discharged; and
a computer connected to the image reading apparatus, wherein
the computer is configured to display a selection screen for selecting an application software to be started in connection with an instruction, which is an instruction to end reading operation of the read-target medium and is issued by the operating unit according to an operation performed by the user, and to start executing the application upon selection of the application on the selection screen, so that the image data of the read-target medium can be processed by the selected application.

7. An image reading system comprising:
an image reading apparatus including,
an operating unit that is configured to issue a read-operation starting instruction for starting a reading operation on a read-target medium, according to a user's operation,
a conveying unit that conveys the read-target medium,
a display unit that displays states of the read-target medium conveyed,
a reading unit that is configured to read the read-target medium,
a control unit that controls the conveying unit and the reading unit, and
a medium detecting unit that detects the read-target medium, wherein
the display unit is configured to display contents indicating that the reading operation is possible when the reading operation of the read-target medium is completed after the read-target medium has passed through the reading unit being conveyed by the conveying unit and the medium detecting unit does not detect the read-target medium,
the conveying unit is configured to start conveyance of the read-target medium response to the read-operation starting instruction issued by the operating unit, when the read-target medium is a first medium in a set of media, and when the medium detecting unit detects the first medium, and the conveying unit is further configured to start conveyance of the read-target medium, when the read-target medium is a second or later medium in the set of media, after the medium detecting unit detects the second or later medium, and
the control unit performs a read completion operation after the read-target medium is discharged, when an instruction to end the reading operation is issued by the user after the read-target medium passes through the reading unit and before the read-target medium is discharged; and
a computer connected to the image reading apparatus, wherein
the computer is configured to start a predetermined application in connection with an instruction, which is an instruction to end reading of the read-target medium and is issued by the operating unit operated by the user, so that the image data of the read-target medium can be processed by the predetermined application.

* * * * *